US008529327B2

(12) United States Patent
Gurovich et al.

(10) Patent No.: US 8,529,327 B2
(45) Date of Patent: Sep. 10, 2013

(54) DYNAMIC USER TESTING AND COLLECTIVE INTELLIGENCE IN A WAGERING GAME ENVIRONMENT

(75) Inventors: Danilo Gurovich, Oak Park, IL (US); Shridhar P. Joshi, Naperville, IL (US); Mark C. Pace, Palatine, IL (US)

(73) Assignee: WMS Gaming, Inc, Waukegan, IL (US)

(*) Notice: Subject to any disclaimer, the term of this patent is extended or adjusted under 35 U.S.C. 154(b) by 427 days.

(21) Appl. No.: 12/841,757

(22) Filed: Jul. 22, 2010

(65) Prior Publication Data

US 2012/0021814 A1 Jan. 26, 2012

(51) Int. Cl.
*A63F 13/00* (2006.01)

(52) U.S. Cl.
USPC .................... 463/16; 463/23; 463/25; 463/43

(58) Field of Classification Search
USPC ........................ 463/29, 40, 42, 43, 16, 23, 25
See application file for complete search history.

(56) References Cited

U.S. PATENT DOCUMENTS

| | | | | |
|---|---|---|---|---|
| 8,185,608 | B1 * | 5/2012 | York et al. | 709/218 |
| 2006/0026210 | A1 * | 2/2006 | Vaszary et al. | 707/200 |
| 2006/0101457 | A1 * | 5/2006 | Zweifel et al. | 717/174 |
| 2008/0155538 | A1 * | 6/2008 | Pappas | 718/100 |
| 2009/0318231 | A1 * | 12/2009 | Lange | 463/42 |

* cited by examiner

*Primary Examiner* — James S McClellan
(74) *Attorney, Agent, or Firm* — DeLizio Gilliam, PLLC

(57) ABSTRACT

Dynamic user testing implemented in a wager gaming environment allows new content to be tested on-the-fly, and allows the content presented on the wagering game machines to be accordingly varied, while live, based on the dynamic user testing of the new content. Such dynamic user testing allows the new content to be tested without implementing expensive testing processes. Moreover, the new content can be provided on-the-fly for presentation on the wagering game machines without affecting an ongoing wagering game or taking the wagering game machines offline if the new content is determined to be more successful than the current content. Dynamic user testing allows a wager gaming environment to collect data for creating new wagering games, for promoting wagering games, and for testing new content across multiple platforms.

21 Claims, 7 Drawing Sheets

DYNAMIC USER TESTING AND COLLECTIVE INTELLIGENCE IN A WAGERING GAME ENVIRONMENT

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to dynamic user testing in a wagering game environment.

BACKGROUND

Collaborative filtering and A/B testing are popular marketing testing techniques designed to test the impact of a product on users. Collaborative filtering involves making predictions about a user's interests based on preference information collected from many users with similar interests. In collaborative filtering, users with preferences similar to the preferences of a current user are identified and information associated with the identified users is used to calculate a prediction for the current user. In A/B testing, users are randomly provided a control sample (option A) or a challenger sample (option B). User responses are evaluated to quantify the performance of the challenger sample over the control sample.

BRIEF DESCRIPTION OF THE FIGURES

Embodiments of the invention are illustrated in the Figures of the accompanying drawings in which.

DESCRIPTION OF THE EMBODIMENTS

Figure 1:
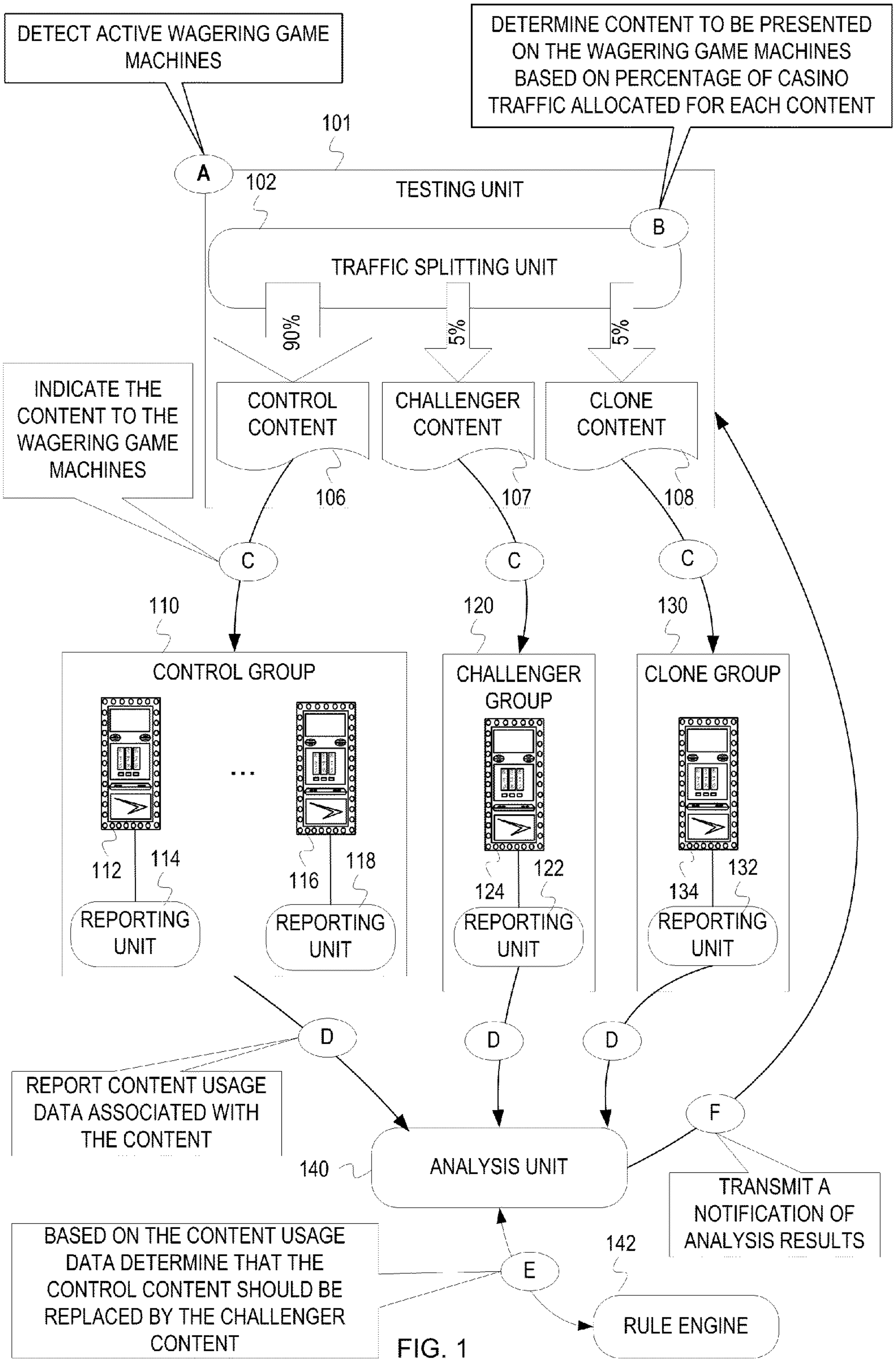
FIG. 1 is a conceptual diagram illustrating example operations for dynamic user testing of content on a wagering game machine.

The description that follows includes exemplary systems, methods, techniques, instruction sequences, and computer program products that embody techniques of the present inventive subject matter. However, it is understood that the described embodiments may be practiced without these specific details. For instance, although examples refer to implementing dynamic user testing for analyzing impact of content presented by a wagering game machine, in other implementations, the dynamic user testing can be implemented on other suitable platforms such as leaderboards, an online gaming environment, point of sale devices, viewports, etc. In other instances, well-known instruction instances, protocols, structures, and techniques have not been shown in detail in order not to obfuscate the description.

Introduction

User testing is often implemented in a marketing environment to test users' responses to new products ("user response testing"), to determine the users' preferences for certain products based on the users' selections and other factors. For example, online marketing stores suggest products to a user that the user might like based on the user's purchase history and/or based on preferences of other users with a similar purchase history. However, most existing user response testing mechanisms rely on the users to actively rate a product or service (e.g., by filling out a survey form). The existing user response testing mechanisms are also static in that they analyze historical data, determine trends in the historical data, and use mathematical algorithms to predict user responses based on the trends in the historical data.

Dynamic user testing can be implemented in a wager gaming environment to dynamically test the popularity of new wagering game content, and present the most popular wagering game content determined from the testing. Dynamic user testing can also be implemented to identify content (e.g., wagering games, layout, individual elements of a wagering game, marketing offers, etc.) that yield a desired conversion rate and that are most profitable. A dynamic user testing unit tests new content by providing the new content to a subset of wagering game machines in a wager gaming environment (e.g., casino). The dynamic user testing unit receives content usage data that indicates players' responses to the new content. On receiving the content usage data, the dynamic user testing unit compares the content usage data corresponding to the new content against content usage data corresponding to a current content that is known to meet delineated success metrics. The dynamic user testing unit determines whether the new content should be discarded or should be presented to the players based on the comparison. For example, on determining that the new content outperforms the current content, the new content can be quickly pushed out for presentation on the wagering game machines of the wagering game environment. Dynamic user testing can be implemented to test new content based on demographic groups, emotional state, and other factors. The content presented on a player's wagering game machine can be varied depending on a demographic group to which the player belongs, the player's current emotional state, the player's game play behavior, etc.

Dynamic user testing implemented in a wager gaming environment allows new content to be tested on-the-fly, and allows the content presented on the wagering game machines to be accordingly varied, while live, based on the dynamic user testing of the new content. Because the players are not aware of ongoing tests, results of testing the new content may be more accurate and may be less subject to falsification or manipulation of results. Such dynamic user testing allows the new content to be tested without implementing expensive testing processes. Moreover, the new content can be provided on-the-fly for presentation on the wagering game machines without affecting an ongoing wagering game or taking the wagering game machines offline if the new content is determined to be more successful than the current content.

Dynamic user testing allows a wager gaming environment to collect data for creating new wagering games, for promoting wagering games, and for testing new content across multiple platforms.

FIG. 1 is a conceptual diagram illustrating an example system for dynamic user testing of content on wagering game machines. FIG. 1 depicts a testing unit 101. The testing unit 101 comprises a traffic splitting unit 102. The testing unit 101 has control content 106, challenger content 107, and clone content 108 stored. Other implementations can store the content in a device separate from the testing unit 101. The testing unit 101 supplies the control content 106, the challenger content 107, and the clone content 108 to one or more wagering game machines on a casino floor.

FIG. 1 depicts wagering game machines 112, 116, 122, and 134. Each of the wagering game machines 112, 116, 124, and 134 respectively comprises a reporting unit 114, 118, 122, and 132. The reporting units 114, 118, 122, and 132 are communicatively coupled with an analysis unit 140. The analysis unit 140 is communicatively coupled with a rule engine 142 and with the testing unit 101. The analysis unit 140, rule engine 142, and testing unit 101 can be implemented on one or more devices. The functionality of the analysis unit 140, rule engine 142, and the testing unit 101 can be implemented to varying degrees as software and/or hardware (e.g., machine executable instructions, application specific integrated circuits, field programmable gate arrays, etc.).

Content presented on a wagering game machine can be one of the control content 106, the challenger content 107, and the clone content 108. Content can comprise any one or more of a wagering game, a menu option or other graphical user interface (GUI) component on the wagering game, a marketing offer, or other content that may be encountered during the course of game play. The control content 106 represents previously tested content or a best solution extant for achieving delineated success factors (e.g., in terms of a threshold rate of conversions, profitability, etc.). The control content 106 may be determined based on historical analysis, controlled user testing, AB Testing, best guesses of casino operators, etc. The challenger content 107 represents content that is being tested against the control content 106 to measure the ability of the challenger content 107 to exceed performance of the control content 106 (e.g., increase the current rate of conversions). For example, a challenger menu configuration may be compared against a (previously tested) control menu configuration to determine which of the two menu configurations is more popular. To ensure that the delineated success factors are met even when the challenger content 107 is being tested, traffic that comprises the challenger content 107 ("challenger traffic") is typically a small sample of the total traffic in the casino. To comparatively evaluate the small percentage of challenger traffic that comprises total traffic, the clone content 108 is utilized. The clone content 108 is a substantially similar (e.g., a distinct copy) to the control content 106 (differences may arise from variances in hardware presenting the control content and the clone content), and clone traffic is allocated at the same volume of traffic as the challenger traffic. In other words, the percentage of wagering game machines that present the clone content 108 is equal to the percentage of wagering game machines that present the challenger content 107. In FIG. 1, the testing unit 101 supplies the control traffic to a control group 110, which comprises the wagering game machines 112, 116; the challenger traffic to a challenger group 120, which comprises the wagering game machine 124; and the clone traffic to a clone group 130, which comprises the wagering game machine 134. The testing unit 101 implements functionality to determine and provide appropriate content to the wagering game machines as will be described in stages A-C.

At stage A, the testing unit 101 detects active wagering game machines. For example, the testing unit 101 can determine that a player has logged into a wagering game machine, has selected an option (e.g., clicked on a menu button, initiated a wagering game, etc.) on the wagering game machine, etc. As another example, the testing unit 101 can detect or receive a notification of a game based event (e.g., a player winning or losing N wagering games in a row, a player attempting to cash out, etc.).

At stage B, the traffic splitting unit 102 determines appropriate content that should be presented by each of the active wagering game machines based on a percentage of traffic allocated for each type of content ("allocated traffic percentage"). The traffic splitting unit 102 identifies the challenger content 107 (e.g., from available challenger content in the testing unit 101) and determines how the control content 106, the challenger content 107, and the clone content 108 should be allocated to the wagering game machines to efficiently test the challenger content 107 without affecting current success metrics. The traffic splitting unit 102 randomly splits the wagering game machines into various testing groups (e.g., control group 110, challenger group 120, and clone group 130) and accordingly provides one of the control content 106, the challenger content 107, and the clone content 108 in accordance with the allocated traffic percentages. The allocated traffic percentages indicate a percentage of the total casino traffic that should receive the control content 106, the challenger content 107, and the clone content 108. The allocated traffic percentages can be selected to achieve a balance between yielding faster results in comparing the control content 106 and the challenger content 107 and minimizing risk to the current success metrics. As depicted in FIG. 1, based on the allocated traffic percentages, the traffic splitting unit 102 determines that the control traffic should account for 90% of the total casino traffic, that the challenger traffic should account for 5% of the total casino traffic, and that the clone traffic should account for the remaining 5% of the total casino traffic. In other words, the traffic splitting unit 102 determines that the control content 106 should be provided to 90% of the active wagering game machines (i.e., the wagering game machines currently presenting wagering games to players), that the challenger content 107 should be provided to 5% of the active wagering game machines, and that the clone content 108 should be provided to the remaining 5% of the active wagering game machines.

In determining the appropriate content that should be provided for presentation by the wagering game machines, the traffic splitting unit 102 ensures that a player continuously interacts with the same version of the content as long as a test is in progress. For example, the traffic splitting unit 102 may present a first version of a welcome screen (e.g., as part of the challenger content 107) to the player when the player first logs onto the wagering game machine. After the player logs off and/or another play logs into the wagering game machine, the testing unit 101 can determine which content to provide to the wagering game machine to conform to the allocated traffic percentages. In other words, the testing unit 101 does not statically supply traffic to a wagering game machine. Several players may use the wagering game machine 124, while a same player plays at the wagering game machine 116. To conform to the allocated traffic percentages, the traffic splitting unit 101 may start supplying control traffic to the wagering game machine 124. For example, the traffic splitting unit 102 ensures that a player always sees the challenger version of a welcome screen for the duration of the player's session. After the test is completed, the traffic splitting unit 102 can determine whether the wagering game machine should present the challenger version of the welcome screen or whether the wagering game machine should present the control version of the content. The traffic splitting unit 103 may also start sending the control version of the welcome screen to the wagering game machine. In addition, a wagering game machine may present the same welcome screen to different players, but, for dynamic testing purposes, the wagering game machine may be part of the control group 110 for one player and part of the clone group for another player.

At stage C, the traffic splitting unit 102 indicates the content to the wagering game machines. The traffic splitting unit 102 may supply the content to the wagering game machines or may identify the content to the wagering game machines. If the content is identified and not supplied, the wagering game machines can select the identified content stored locally, access the identified content over a network, etc. As depicted in FIG. 1, the traffic splitting unit 102 provides the control content 106 to the control group 110. The traffic splitting unit 102 provides the challenger content 107 to the challenger group 120. The traffic splitting unit 102 provides the clone content 108 to the clone group 130.

It is noted that the traffic splitting unit 102 is not restricted to providing the content for presentation by wagering game machines. The traffic splitting unit 102 can also implement functionality to distribute content across multiple platforms and to various wagering game endpoints (e.g., leaderboards, viewports, hand held gaming devices, computer systems in an online gaming environment, etc). For example, the traffic splitting unit 102 can direct an online game server (not shown) to provide content to a computer system presenting an online wagering game. As another example, the traffic splitting unit 102 can direct a leaderboard server (not shown) to present different content on each leaderboard in a casino. This will further be described in FIG. 2.

At stage D, the reporting units 114, 118, 122, and 132 report, to the analysis unit 140, results of presenting the content on the respective wagering game machines 112, 116, 124, and 134 ("content usage data"). The content usage data can correspond to a player's response to the content presented on the player's wagering game machine. The reporting unit (e.g., the reporting unit 122) can be configured to capture the player's response (e.g., a player selecting a graphical user interface (GUI) object) to the content presented on the player's wagering game machine 124, and provide the player's response for analysis. The reporting unit 122 records and reports the player's choices and flows (e.g., after the player selected button A, the player selected option B). Thus, the reporting units collect content usage data generated as a result of player interaction with the respective wagering game machines, and provide the content usage data to the analysis unit 140. For example, the challenger content 107 may comprise displaying an album-style menu (e.g., presenting a full screen view of each wagering game offered by the wagering game machine) on the wagering game machine 124. The reporting unit 122 associated with the wagering game machine 124 detects and keeps track of player inputs on the wagering game machine 124. For example, the reporting unit 122 determines that the player thrice clicked on a button to view a next wagering game, and then selected the fourth wagering game from the album-style menu.

In some implementations, as depicted in FIG. 1, each wagering game machine may be associated with or may comprise a dedicated reporting unit that publishes the content usage data to a channel to which the analysis unit 140 subscribes. In another implementation, the reporting unit may not be a part of the wagering game machine. Instead, each wagering game machine may determine the content usage data. A single reporting unit may receive content usage data provided by multiple wagering game machines. For example, a single reporting unit may receive content usage data from a bank of wagering game machines. As another example, the casino may be divided into multiple areas (e.g., groups of collocated wagering game machines). Wagering game machines in each area may provide content usage data to a single reporting unit. Each reporting unit, in turn, can provide the collected content usage data to the analysis unit 140. In some implementations, the reporting units 114, 118, 122, 132 may report all the collected content usage data to the analysis unit 140. The analysis unit 140 might filter the received content usage data and compare the filtered content usage data against thresholds, rules, etc. In other implementations, the reporting units 114, 118, 122, 132 may report only part of the collected content usage data (e.g., data associated with predefined metrics) to the analysis unit 140. For example, the testing unit 101 may notify the reporting units 114, 118, 122, 132 that tests are being performed to determine a popular menu option. Accordingly, the reporting units 114, 118, 122, 132 limit reporting of content usage data to that associated with players selecting menu. The reporting units 114, 118, 122, 132 provide the content usage data for analysis in an active environment to allow on-the-fly variation in content presented by the wagering game machines.

At stage E, the traffic analysis unit 140 analyzes the content usage data associated with the control content 106, the challenger content 107, and the clone content 108 in view of predefined rules in the rule engine 142, and determines that the control content 106 should be replaced by the challenger content 107. In addition to receiving the content usage data from the reporting units, the analysis unit 140 may also receive information from the traffic splitting unit 102. Example information indicates tests currently being run (e.g., differences between the challenger content 107 and the control content 106), the allocated traffic percentages, which wagering game machines are assigned to which groups, etc.

The traffic analysis unit 140 first generates one or more metrics (e.g., conversion rate) from the content usage data. The traffic analysis unit 140 generates a clone usage metric based on analyzing the clone content usage data, a control usage metric based on analyzing the control content usage data, and a challenger usage metric based on analyzing the challenger content usage data. The traffic analysis unit 140 analyzes the clone usage metric in view of the control usage metric to ensure that the challenger content 107 will be appropriately evaluated (e.g., in terms of traffic volume) against the control content 106. The analysis unit 140 deems the test to be complete and the clone usage data to be representative of the control usage data when the clone usage metric is equal or substantially equal to the control usage metric. The traffic analysis unit 140 then analyzes the challenger usage metric in view of the control usage metric to determine whether the challenger content 107 outperforms the control content 106. The content associated with the higher usage metric is deemed to be more popular in this instance. For example, the challenger content 107 comprises an album-style menu for selecting wagering games, while the control content 106 (and consequently the clone content 108) comprises a drop-down menu for selecting wagering games. The analysis unit 140 determines, based on the control usage metric, that the control content 106 has a 95% conversion rate. The analysis unit 140 then compares the challenger usage metric, which has a conversation rate of 97%, against the control usage metric, and determines that the challenger content 107 outperforms the control content 106. Accordingly, the analysis unit 140 can indicate that the control content 106 should be replaced by the challenger content 107.

In evaluating the usage metrics, the analysis unit 140 consults the rules engine 142 that comprises business rules for presenting profitable wagering games and content. The rules engine 142 can comprise a Rete-based system that runs rules predetermined by a casino operator. The analysis unit 140 can consult the rules engine 142 to determine whether the challenger content 107 should be dropped, whether the challenger content 107 should completely replace the control content 106, whether the challenger content 107 should replace the control content 106 only on some of the wagering game machines currently presenting the control content 106, etc. The analysis unit 140 can accordingly notify the testing unit 101 and/or a wagering game server (not shown) of the results of the analysis.

In some implementations, the analysis unit 140 analyzes content usage data to test popularity of various configurations of GUI objects of the wagering game, popularity of customization options, etc. For example, based on analyzing the content usage data, the analysis unit 140 may determine a set of popular customization options (e.g., album-style menu, black screen with white lettering, etc.) as selected by a majority of the players. As another example, a wagering game may allow players to configure functionality of various buttons presented by the wagering game machine and to customize the position/functionality of the buttons. The analysis unit 140 may, based on analyzing the content usage data, determine popular functionalities of the buttons and common positions of the buttons.

At stage F, the analysis unit 140 transmits a notification of the analysis results, determined at stage E, to the testing unit 101. In FIG. 1, the analysis unit 140 transmits a notification to indicate that the challenger content 107 should replace the control content 106. In some implementations, prior to transmitting the notification, the analysis unit 140 may first present the notification on a dashboard and request confirmation from the casino operator. On receiving the confirmation from the casino operator, the analysis unit 140 may transmit the notification to the wagering game server, the testing unit 101, and/or other content servers. In some implementations, the analysis unit 140 may indicate the analysis results to the testing unit 101 and may also provide suggestions regarding subsequent procedures. For example, the analysis unit 140 can indicate that the challenger content 107 outperforms the control content 106, can indicate that the challenger content 107 should replace the control content 106, and can also suggest back testing. In other implementations, the testing unit 101 may receive the analysis results and may determine subsequent procedures. For example, the analysis unit 140 can indicate to the testing unit 101 that the challenger content 107 has a conversion rate of 50%, while the control content 106 has a conversion rate of 98%. Based on this knowledge, rules in the rules engine 142, and/or input from the casino operator, the testing unit 101 can discard or not use the challenger content 107.

Although FIG. 1 refers to wagering game machines receiving content when discussing traffic, embodiments are not so limited. The term traffic is not confined to wagering game machines. The term traffic refers to data transmitted over a network for a session. Clone traffic refers to data transmitted involving clone content. Challenging traffic refers to data transmitted over the network involving challenger content. And control traffic refers to data transmitted over the network involving control content. Moreover, embodiments are not limited to determining allocated traffic percentages and determining conformity to allocated traffic percentages based on wagering game machines. Embodiments can determine allocated traffic percentages and conformity to allocated traffic percentages based on sessions. For instance, 5% of traffic to individual sessions throughout a casino may be allocated for challenger traffic. Each time a login event occurs at a wagering game machine, for example, the testing unit increments total traffic count and the traffic splitter indicates content to be presented at each session in accordance with the allocated traffic percentages.

It should be noted that although FIG. 1 depicts the traffic splitting unit 102 providing content to the wagering game machines 112, 116, 124, and 134 based on the allocated traffic percentages, embodiments are not so limited. In some implementations, the traffic splitting unit 102 may take characteristics of the player at the wagering game machine into consideration, when determining the content to be provided for presentation by the wagering game machine. For example, the traffic splitting unit 102 may select content to be presented by the wagering game machine based on previously configured player preferences, preferences of other players that fall within a demographic group to which the player at the wagering game machine belongs, etc. The traffic splitting unit 102 may access the rules engine 142 to determine the content that should be provided to the wagering game machine. As an example, a rule in the rules engine 142 can state, "match any female player over the age of 42 to an album-style menu". On determining that the player at the wagering game machine 134 is a female player over the age of 42, the analysis unit 140 can provide wagering game content with an album-style menu to the wagering game machine 134.

It is also noted that in some implementations, the analysis unit 140 may have hooks into external data sources, and may use data from the external data sources to determine the efficacy of the challenger content 107 with respect to the control content 106, to determine content that should be provided to a player's wagering game machine, etc. For example, the analysis unit 140 may use data from customer relationship management (CRM) systems, adaptive gaming platforms, third-party persistence layers, etc., to determine content (challenger and/or control content) that should be provided to the player's wagering game machine. As another example, the analysis unit 140 can determine the player's characteristics (e.g., age, place of residence, etc.) from a player account server and can determine promotions that the player is most likely to accept based on information in the CRM system.

The results of analyzing the content usage data are not restricted to a single platform (e.g., the platform on which the challenger content 107 is tested). Integration of multiple platforms for testing new content and presenting the new content can be implemented based on knowledge that demographic groups at one platform are most likely to also access another platform. For example, players that play wagering games at wagering game machines in a casino are most likely to play online wagering games. The analysis unit 140 can control the content presented by other content servers so that the most popular content (as determined based on dynamic user testing) is presented across multiple platforms and to multiple wagering game endpoints, as will be described with reference to FIG. 2.

Figure 2:
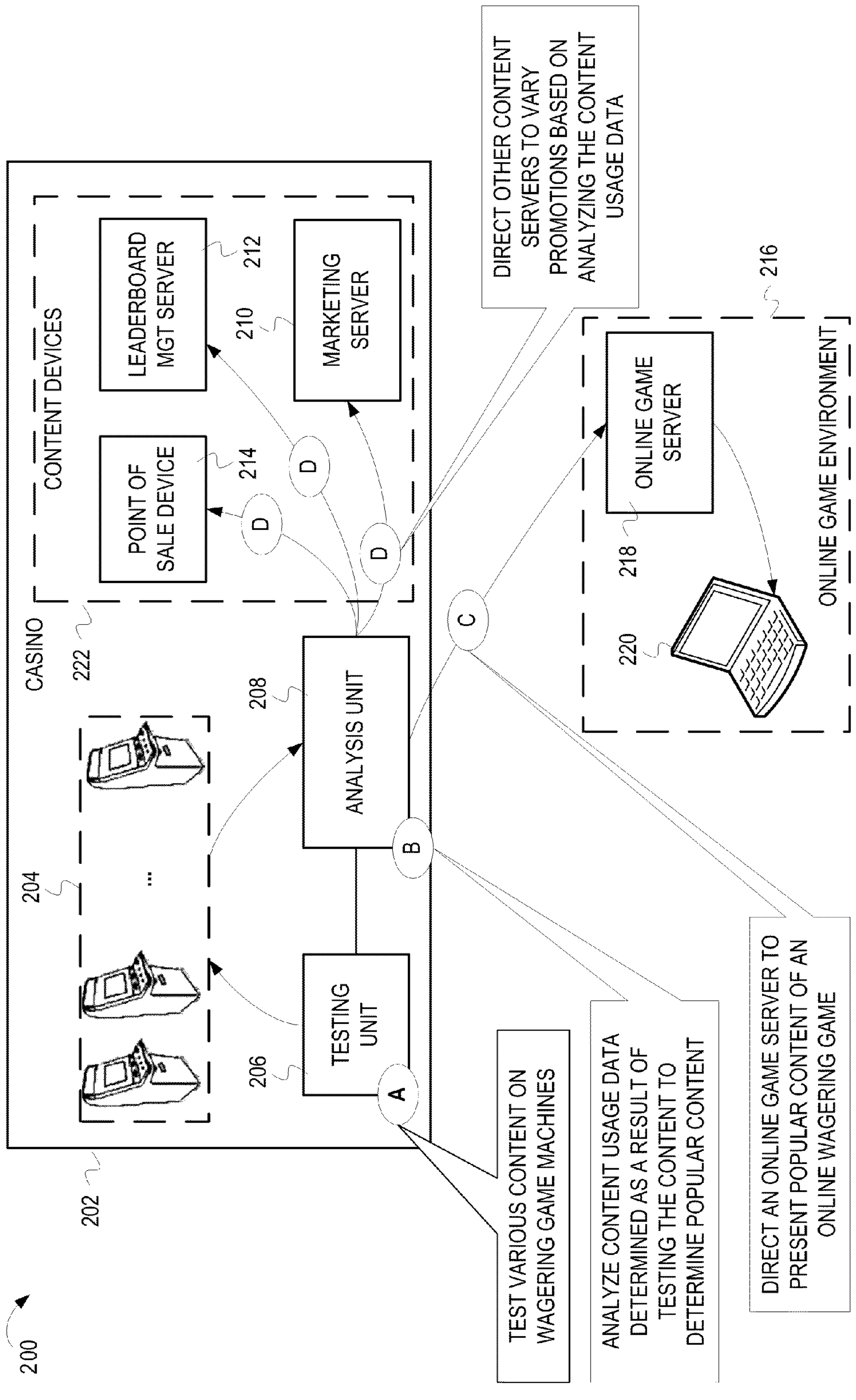
FIG. 2 is a conceptual diagram illustrating testing and deployment of content across multiple gaming platforms.

FIG. 2 is a conceptual diagram illustrating testing and deployment of content across multiple platforms. FIG. 2 depicts a casino 202. The casino 202 comprises wagering game machines 204, a testing unit 206, and an analysis unit 208. The wagering game machines 204 are coupled with the testing unit 206 and with the analysis unit 208. The testing unit is also communicatively coupled with the analysis unit 208. The casino 202 also comprises content devices 222 including a point of sale device 214, a leaderboard management server 212, and a marketing server 210. The point of sale device 214, the leaderboard management server 212, and the marketing server 210 are all communicatively coupled with the analysis unit 208. FIG. 2 also depicts an online game environment 216. The online game environment 216 comprises an online game server 218 and a laptop 220. The online game server 218 provides online wagering games for presentation by the laptop 220 or other electronic device configured to present the online wagering games. The analysis unit 208 is also communicatively coupled with the online game server 218.

As described with reference to FIG. 1, the analysis unit 208 can analyze content usage data, generate content usage metrics, and compare challenger usage metrics against control/clone usage metrics. Although presented on wagering game machines, the challenger content and the control/clone content need not be based on wagering games (e.g., menu options for wagering games, menu styles for selecting wagering games, commonly selected wagering games, functionality and position of GUI objects, etc.). The challenger content and the control/clone content can be used to test the efficacy of advertisements, marketing offers, leaderboard content, online wagering game elements, etc. Based on the results of analyzing the content usage data, the analysis unit 208 can influence leaderboard displays, marketing offers presented to players, etc. The analysis unit 140 can influence content to be presented on the wagering game machines or other wagering game endpoints (e.g., leaderboards, viewports, hand held gaming devices, computer systems in an online gaming environment) based on player preferences, preferences of a demographic group to which the player belongs, etc. The analysis unit 208 can be configured to interact with the marketing server 210, the leaderboard server 212, the online game server 218, and other content devices via a wired communication network or a wireless communication network. This is further illustrated in stages A-D.

At stage A, the testing unit 206 tests various content on the wagering game machines 204. For example, the testing unit 206 can dynamically update wagering game content, provide different theme choices and customization options to determine the most popular, profitable, and/or engaging content based upon the players' selections (e.g., the content usage data). As another example, the testing unit 206 may generate and present content to perform leaderboard testing. Content can be generated so that leaderboards presented on different wagering game machines have different customization options. As another example, the testing unit 206 may generate content to perform advertisement testing. Content can be generated to test different versions of an advertisement or to test the efficacy of different advertisements. The testing unit 206 can conduct tests (e.g., generate and provide challenger, control, and clone content to players at different wagering game machines) to determine which marketing offers (e.g., casino based offers, third-party offers, casino loyalty programs, etc.) are most likely to achieve a delineated conversion rate. The marketing offers can be gauged by their ability to attract players without interrupting game play and coin-in. The testing unit 206 can present previously untested content to determine the players' response to the content. The content presented by the wagering game machines 204 can comprise different themes that are each to be tested to determine which of the themes are most popular. For example, the content can comprise a menu with 15 wagering game themes or wagering game titles presented in a random order. The testing unit 206 can test the players' responses and interest level in various gaming and non-gaming activities to determine information needed to optimize conversion rate, to increase interest in wagering games, and to make the wagering games easy to play.

At stage B, the analysis unit 208 analyzes results of content usage data received as a result of presenting the content on the wagering game machines 204 to determine popular content. Reporting units in the wagering game machines 204 can record and provide the content usage data (e.g., user inputs on the wagering game machine) to the analysis unit 208. For example, the analysis unit 208 can analyze the content usage data associated with the control, challenger, and clone contents to determine popular customization options (e.g., menu styles, arrangement of graphical objects on the wagering game machine's display unit, audio, an order in which wagering games are presented on the menu, different numbers of graphical elements, etc.). As another example, the analysis unit 208 may analyze content usage data and derive popular leaderboard background, popular leaderboard customization options, etc. As another example, the analysis unit 208 may analyze content usage data received as a result of advertisement testing to identify the most popular advertisements or popular versions of an advertisement. With reference to the example above, where the content can comprise a menu with 15 wagering game themes or wagering game titles presented in a random order, the content usage data can comprise player selections on the menu. As players choose from the wagering game themes, the analysis unit 208 receives and analyses the content usage data (e.g., player selections can be determined and compared) to determine the most popular wagering game themes. For example, based on receiving the players' selections, the most popular wagering game titles can be determined.

The content usage data may also be analyzed based on demographic groups and to information associated with the demographic groups. For example, the analysis unit 208 can determine whether players that belong to a common demographic group respond to the same content in the same manner, and determine differences between demographic groups. The analysis unit 208 can use the information associated with the demographic group to present content to other players that fall within the same demographic group, and/or players that fall outside of the demographic group.

At stage C, the analysis unit 208 directs the online game server 218 to present content of an online wagering game in accordance with the analysis of the testing results. For example, the analysis unit 208 may determine that an album-style menu is not as popular as a drop-down menu. Accordingly, the analysis unit 208 can direct the online game server 218 to use the drop down menu when supplying content to the computer system 220 in the online game environment 216. As another example, the analysis unit 208 may determine a popularity ranking for various wagering games presented by the casino 202. The analysis unit 208 may direct the online game server 216 to present the menu with wagering game titles arranged in order of the determined popularity ranking.

At stage D, the analysis unit 208 directs the other content devices 222 to vary content based on the analysis by the analysis unit 206. For example, the analysis unit 208 may direct the leaderboard management server 212 to vary the content of the leaderboards displayed at various locations around the casino 202 in accordance with the determined popular leaderboard customization options. As another example, based on analyzing the content usage data, the analysis unit 208 may determine the most popular advertisements and may accordingly notify the marketing server 210.

Multi-platform test mashups may also be created, e.g., by presenting an offer on the leaderboard and on viewports with text-messaging response capabilities.

Although not depicted in FIG. 2, in some implementations, the testing unit 206 can provide content for presentation on different platforms and the analysis unit 208 can test the efficacy of testing the content on one platform versus testing the content on another platform. For example, the analysis unit 208 can receive content usage data based on running tests on the wagering game machines 204 and can also receive content usage data based on running the same tests in the online game environment 216. The analysis unit 208 can compare the content usage data generated by running the tests on the wagering game machines 204 and in the online game environment 216 and can determine the more effective testing platform.

It is also noted that although FIG. 2 depicts content being tested on the wagering game machines 204 and being presented accordingly in the online game environment 216, embodiments are not so limited. The content may be tested on any suitable (economical) platform and may be deployed on another platform different from a testing platform. For example, the content can be tested in the online game environment 216 and can be deployed on the wagering game machines 204. As another example, the content may be tested with different standards, different presentation technologies, at different times, etc. Marketing offers may be tested on virtual machines and deployed at the point of sale device 214. It is noted that deployment of content that meets delineated success metrics during testing may be occur on-the-fly. For example, on determining that the challenger content yields a higher conversion rate than the control content in the online game environment 216, the challenger content can immediately be deployed as part of a wagering game on the casino floor. As another example, the content presented by the wagering game machines can be automatically varied to ensure that the content is in accordance with determined popular wagering game themes. The content usage data can continuously be analyzed and the content presented can accordingly be varied to ensure that all players are presented with the most popular themes in the preferred order and to ensure maximum player engagement. The variation in content responsive to results of dynamic user testing allow the content to adapt to changes in player demographics that occur at different times of day, in relation to various events (e.g., tour buses arriving, shows ending, etc.), etc.

It is also noted that player characteristics, determined based on the player's interaction with wagering game machines 204, can also be used to identify and provide content for presentation on other platforms. For example, based on the player's game play history, it may be determined that the player enjoyed playing a new wagering game on the casino floor. Accordingly, on determining that the player has logged into his/her online gaming account, an online version of the new wagering game can be presented to the player.

Example Operations

This section describes operations associated with some embodiments of the invention. In the discussion below, the flow diagrams will be described with reference to the block diagrams presented above. However, in some embodiments, the operations can be performed by logic not described in the block diagrams. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
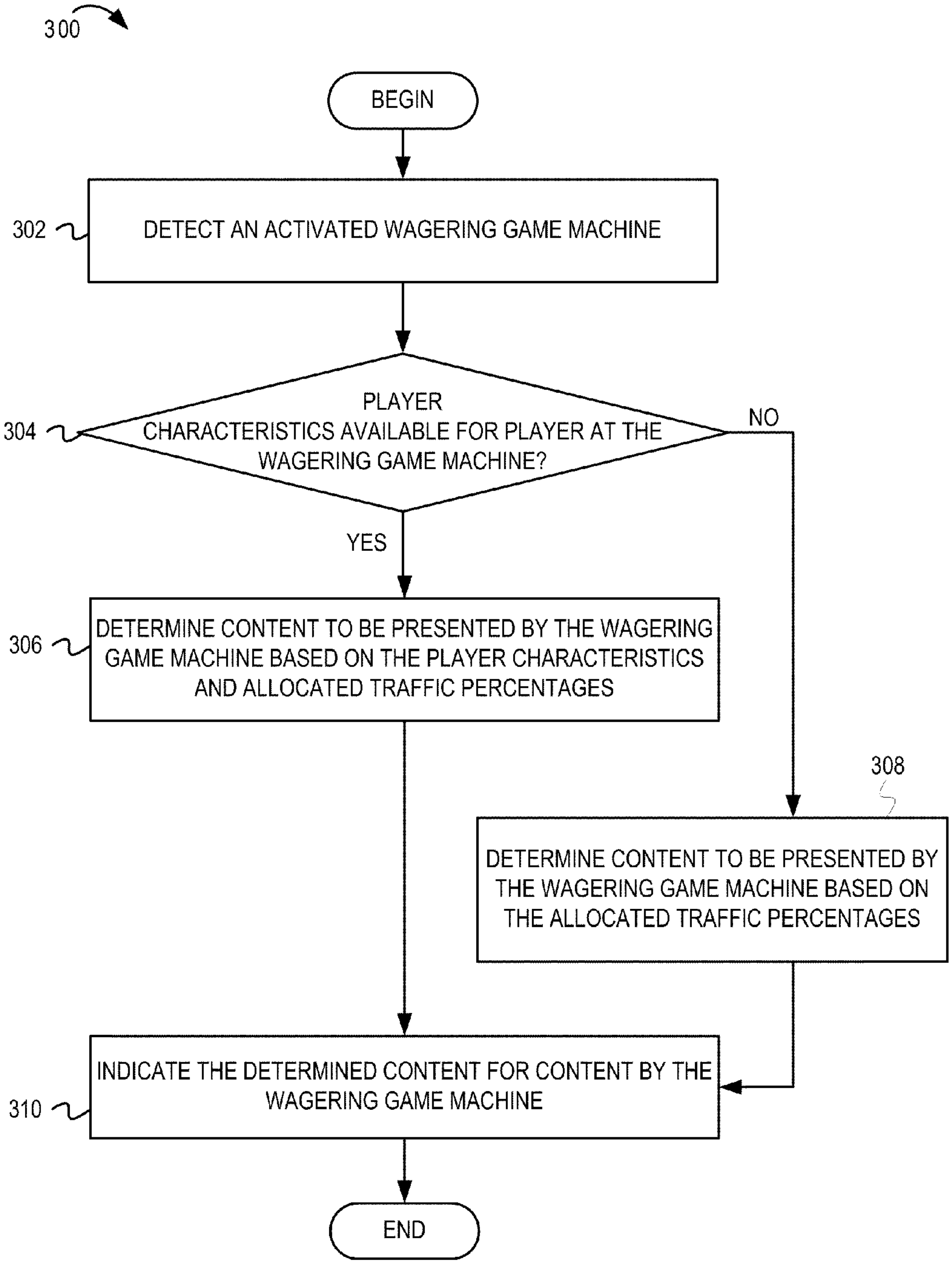
FIG. 3 is a flow diagram illustrating example operations for providing appropriate wagering game content for presentation by a wagering game machine.

FIG. 3 is a flow diagram illustrating example operations for providing appropriate wagering game content for presentation by a wagering game machine. Flow 300 begins at block 302.

At block 302, an activated wagering game machine is detected. For example, it may be determined that a player has logged into the wagering game machine. In some implementations, the wagering game machine may generate a notification when the player logs into the wagering game machine. In addition to detecting the player logging into the wagering game machine, various other events may result in activation of the wagering game machine. Examples of other events include player selections on the wagering game machine, a game-based event, a player attempting to log off the wagering game machine, etc. These events may trigger identification and presentation of new content on the wagering game machine as will be described below. The flow continues at block 304.

At block 304, it is determined whether characteristics of a player at the wagering game machine ("player characteristics") are available. The player characteristics may be used to determine the content that should be provided to the wagering game machine. For example, after login (e.g., by swiping a player card), a player account server is queried to determine whether player characteristics are available for the player at the wagering game machine. The player account server can be accessed to determine general information about the player. The general information about the player can include the player's identification number, age, gender, occupation, place of residence, education level, income-level, how often the player visits the casino, etc. Additionally, the player account server may also indicate the player's game play history, such as a frequency of game play, commonly played wagering games, an order (if any) in which the player plays the wagering games, a time when the player plays the wagering games (e.g., whether the player plays at midnight or at noon), etc. For instance, the player account server may indicate that the player at the wagering game machine plays Jungle Wild video slot games 70% of his/her total game play time and plays online poker for the remaining 30% of the total game play time. The player's winnings, positions on a leaderboard, etc. can also be determined. A marketing server can be accessed to determine marketing offers awarded to the player, the player's marketing offer redemption history, and to determine marketing offers the player is most likely to accept and redeem. In some implementations, the player's purchase history (e.g., at a casino's gift shop, restaurant, etc.) may also be collected. If it is determined that the player characteristics are available, the flow continues at block 306. Otherwise, the flow continues at block 308.

At block 306, content to be presented by the wagering game machine is determined based, at least in part, on the player characteristics and allocated traffic percentages. For example, a traffic splitting unit (e.g., the traffic splitting unit 102 of FIG. 1) can determine whether the activated wagering game machine should present control content, challenger content, or clone content. A casino operator may pre-configure the allocated traffic percentages. However, depending on the performance of the challenger content, the percentage of the total traffic allocated to each of the control content, the challenger content, and the clone content may be varied. For example, the casino operator may initially determine that only 10% of the total casino traffic can be diverted for testing. Accordingly, 90% of the total casino traffic may constitute control traffic (e.g., 90% of active wagering game machines will receive the control content), 5% of the total casino traffic may constitute challenger traffic, and the remaining 5% of the total casino traffic may constitute clone traffic. If it is later determined that the challenger content meets or exceeds delineated success metrics, a higher percentage (e.g., 20%) of the total casino traffic may be allocated to the challenger content and/or new challenger content may be selected for testing. The traffic splitting unit 102 can be configured to split the traffic on a bank-by-bank basis, on a casino wide basis, on a casino-by-casino basis, based on player feedback, etc. For example, it may be determined that the challenger content should be provided to only one specific bank of wagering game machines.

The content to be presented may be selected so that the content is in accordance with the player characteristics. For example, it may be determined, based on player characteristics (e.g., the player's marketing offer redemption history), that a player does not like to eat at steakhouses. Accordingly, the content to be presented may be selected so as not to present a marketing offer for a steakhouse. Alternately, in some implementations, if it is determined that it is more important that the content be selected so as to meet the allocated traffic percentages, the content may be selected even if the selected content is not in accordance with the player characteristics. The flow continues at block 310.

At block 308, the content to be presented by the wagering game machine is determined based, at least in part, on the allocated traffic percentages. The flow 300 moves from block 304 to block 308 on determining that the player characteristics associated with the player at the wagering game machine are not available. On determining that the player characteristics are not available, the content to be presented by the wagering game machine may be determined based on the allocated traffic percentages and/or based on player history associated with the player's current gaming session. For example, it may be determined that the player has just finished playing wagering game "A". The content to be presented on the wagering game machine may be a menu comprising a list of wagering games from which the player can select a next wagering game. The wagering games listed on the menu may be ordered based on knowledge that wagering game A and wagering game B have similar design elements, a similar game strategy, etc. The wagering games listed on the menu may also be ordered based on knowledge that players who played wagering game "A" generally tended to play wagering game "C". After the content to be presented on the wagering game machine is selected, the flow continues at block 310.

At block 310, the selected content is indicated to the wagering game machine. The wagering game machine, in turn, presents the content to the player on a display unit. From block 310, the flow ends.

Figure 4:
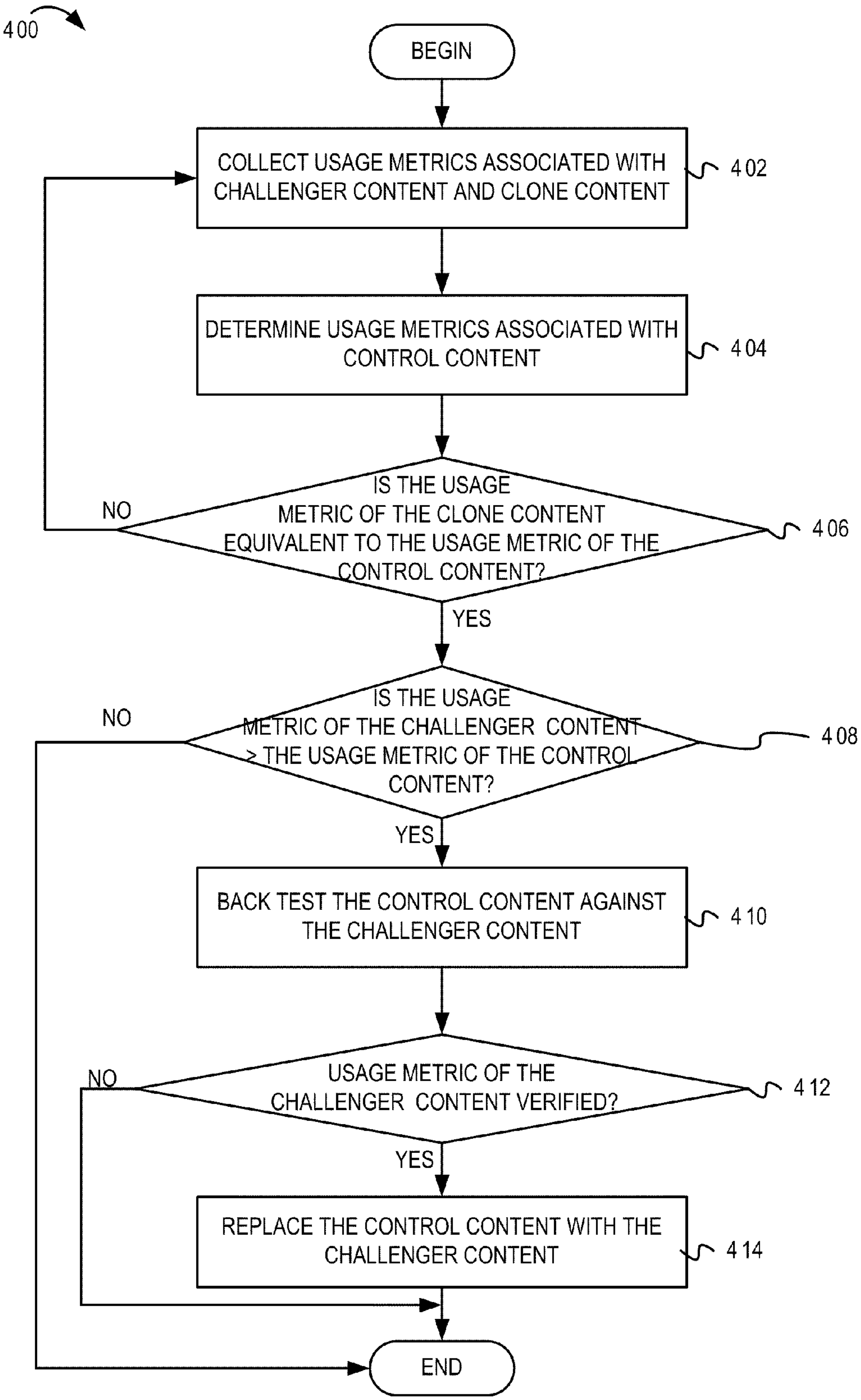
FIG. 4 is a flow diagram illustrating example operations for comparing and analyzing multiple versions of content.

FIG. 4 is a flow diagram illustrating example operations for comparing and analyzing multiple versions of content. Flow 400 begins at block 402.

At block 402, a usage metric associated with challenger content ("challenger usage metric") and a usage metric associated with clone content ("clone usage metric") are collected. The challenger usage metric is based on content usage data generated in response to presenting the challenger content on wagering game endpoints (e.g., wagering game machines, handheld wagering game devices, computer systems in an online game environment, viewports, etc.). Likewise, the clone usage metric is based on content usage data generated in response to presenting the clone content on the wagering game endpoints. As described earlier, the challenger content and the clone content are provided to an equal percentage of active wagering game machines or sessions. For example, each wagering game machine in a casino typically allows a player to select from a list of multiple wagering games. The challenger content and the clone content can be provided to determine popularities of wagering games and to enable the wagering games to be presented in order of their popularity. The challenger content can be generated to present different versions of a menu stack (e.g., placing the wagering games at different positions within the menu stack). The clone content can indicate a current most popular order for presenting the wagering games in the menu stack. For this example, the challenger and the clone usage metrics may indicate a conversion rate of the challenger and the clone content respectively (e.g., whether the position of a first wagering game in the menu stack influences the player to select the first wagering game). As another example, to gauge the popularity of a new wagering game, different variations of a menu can be presented—the new wagering game being located at different positions on each variation of the menu stack. The challenger usage metric and the clone usage metric can indicate the players' responses to the different variations of the menu stack (and accordingly the popularity of the wagering game). As another example, the challenger and the clone usage metrics can be analyzed to determine popular customization options.

Reporting units in each wagering game machine can record player actions and can provide content usage data for analysis. The content usage data can be evaluated based on knowledge of the content that was provided to the wagering game machine, to generate the usage metrics. For example, reporting units on a first and a second wagering game machines may report that the player selected the wagering game in response to receiving the challenger content. A reporting unit on a third wagering game machine may report that the player did not select the wagering game in response to receiving the challenger content. Based on the content usage data, it can be determined that a conversion rate associated with the challenger content is 66%. The flow continues at block 404.

At block 404, usage metrics associated with control content ("control usage metric") are determined. The control content indicates content that is known to achieve delineated success metrics. The control usage metric is based on content usage data generated in response to providing the control content to a remainder of the wagering game machines (e.g., those that do not receive the challenger content or the clone content). Typically, control traffic accounts for a higher percentage of the total casino traffic so that the casino does not suffer on account of testing the challenger content. In one implementation, the reporting units on the wagering game machines that received the control content can record and report content usage data for analysis. The content usage data associated with the control content can be analyzed, as described above, to generate the control usage metric. In another implementation, the control usage metric may not be calculated. Instead, a previously calculated control usage metric can be used to determine the efficacy of the challenger content. The flow continues at block 406.

At block 406, it is determined whether the clone usage metric is equivalent to the control usage metric. Because clone traffic represents only a small fraction of the total casino traffic, the clone usage metric being equivalent to the control usage metric indicates that the clone usage metric is representative of the control usage metric. In other words, the clone usage metric being equivalent to the control usage metric indicates that the clone content (and consequently the challenger content) has been provided to a sufficient number of wagering game machines to be able to accurately compare the challenger content against the clone/control content. Based on knowledge of the control usage metric, the clone usage metric can be used to determine the length of a test (e.g., the duration of time for which the challenger content should be provided to wagering game machines). For example, based on knowledge that the control content achieves an 80% conversion rate, the test can be deemed to be complete when the clone content also achieves the 80% conversion rate. If it is determined that the clone usage metric is equivalent to the control usage metric, the flow continues at block 408. Otherwise, the flow loops back to block 402.

At block 408, it is determined whether the challenger usage metric exceeds the control usage metric. The challenger usage metric can be compared against the control usage metric to determine whether the challenger content outperforms the control content. For example, it may be determined that the challenger usage metric exceeds the control usage metric based on determining that the challenger content results in a 98% conversion rate while the control content results in a 95% conversion rate. As another example, it may be determined that the challenger content does not outperform the control content based on determining that the challenger content results in a 80% conversion rate while the control content results in a 95% conversion rate. If it is determined that the challenger usage metric exceeds the control usage metric, then flow continues at block 410. Otherwise, the flow ends.

At block 410, the control content is back tested against the challenger content. Back testing involves reversing the test when potential new control content is identified. The flow moves from block 408 to block 410 after it is determined that the challenger content outperforms the control content. In other words, back testing is performed to ensure that the challenger content will yield the same results (e.g., the same usage metric) if the challenger content replaces the control content. During back testing, the challenger content is substituted as the new control content, a clone of the new control content is generated, and the previous control content is used as the new challenger content. The back test is run to determine whether the same usage metrics are achieved when the control content is replaced by the challenger content. In some implementations, back testing may be performed if it is determined that the challenger content outperforms the control content by a predefined threshold. For example, back testing may be performed if it is determined that that the conversion rate of the challenger content exceeds the conversion rate of the control content by 10%. Other embodiments may perform back testing if challenger content outperforms the control content, but does not outperform beyond a predefined threshold. The flow continues at block 412.

At block 412, it is determined whether the challenger usage metric is verified. As described above, during back testing, the challenger content is substituted as the new control content, while the control content is substituted as the new challenger content. A new control usage metric is determined and the new control usage metric is compared against the previous challenger usage metric. If it is determined that the challenger usage metric is verified, the flow continues at block 414. Otherwise, the control content is not replaced and the flow ends.

At block 414, the control content is replaced by the challenger content. The flow 400 moves from block 412 to block 414 after it is determined and verified that the challenger content outperforms the control content. For example, in a test for comparing a new functionality of a wagering game GUI component against previously tested functionality of the wagering game GUI component, it may be determined that the new functionality of the wagering game GUI component as presented in the challenger content results in a higher conversion rate/is more popular as compared to the previously tested functionality of the wagering game GUI component as presented in the control content. Accordingly, the challenger content replaces the control content as the new control content, a clone of the new control content is generated, and new challenger content may be identified to test against and to continuously optimize the new control content. In some implementations, the previous control content may be discarded in favor of the new control content. In some implementations, however, the previous control content may not be discarded. Instead, the new control content may replace a majority of the previous control content and the previous control content may still be presented on a small percentage of the wagering game machines or may be presented to certain demographic groups.

In some implementations, on determining that the challenger content associated with a wagering game outperforms the control content, wagering game configuration data can be updated so that the most popular configuration settings (as determined based on analysis operations described above) are presented as part of the wagering game when the player selects the wagering game. If a player has selected configuration settings that are different from the most popular configuration settings, the player-selected configuration settings are loaded with the wagering game, and the most popular configuration settings are stored as default settings.

In addition to testing the challenger content, the content usage data can also be analyzed to estimate the player's state of mind while the player is interacting with the content and after the player interacts with the content. For example, the content usage data can be analyzed to determine a next wagering game that the player selects after playing a current wagering game. Additionally, a more complex analysis can be performed to test a next wagering game selected based on events encountered in the current wagering game. For example, the content usage data can be analyzed to determine a next wagering game that the player selects after winning the current wagering game. Likewise, the content usage data can be analyzed to determine a next wagering game that the player selects after losing the current wagering game. It may be determined, for example, that the player selects a gambling-oriented wagering game after winning the current wagering game and that the player selects a time-oriented wagering game after losing the current wagering game. In some implementations, the operations for testing the player's game play behavior based on the player's estimated emotional state can be implemented on multiple platforms. The results generated based on the testing can be compared to determine if the player's game play behavior varies depending on the platform. From block 414, the flow ends.

It should be noted that although FIG. 4 depicts the flow 400 ending after it is determined that the challenger usage metric does not exceed the control usage metric (block 408) or after it is determined that the challenger usage metric cannot be verified (block 412), embodiments are not so limited. In some implementations, it may be determined whether the challenger content should be discarded. The challenger content may be discarded if the challenger usage metric is less than the control usage metric by at least a threshold percentage. For example, it may be determined that the challenger content should be discarded if the challenger usage metric is less than the control usage metric by 15%. The challenger content may also be discarded if the challenger usage metric cannot be reproduced during back testing. In some implementations, the challenger usage metric may be further analyzed to determine whether the challenger content outperforms the control content only under certain conditions (e.g., at a specified time, when presented to a specific demographic group, etc.). If so, the challenger content may be stored and may be presented when these conditions occur (e.g., on determining that a player belongs to the specific demographic group).

It is noted that in some implementations, the challenger content may be tested under predefined conditions (e.g., during certain times of the day, on certain demographic groups, etc.) to generate content usage data when little or no content usage data is available for the challenger content and/or for the predefined conditions. Testing parameters (e.g., time for running the test, allocated traffic percentages, etc.) can be dynamically varied (e.g., by the traffic splitting unit 102 of FIG. 1) depending on current performance of the challenger content. For example, during times when the control content is very well tested and a high-traffic load is anticipated, operations for testing the challenger content may be suspended to maximize revenue during high-traffic time intervals. As another example, the challenger content may be discarded during the duration of the test, if the challenger content is not performing well. As another example, a higher percentage of the total casino traffic may be allocated to the challenger content, if the challenger content exceeds performance expectations.

It is noted that testing may not always comprise comparing the challenger content to the control/clone content. In some implementations, content that has not been previously tested may be presented to gauge the players' response to the content. For example, content can be provided to determine popularities of wagering games and to enable the wagering games to be presented in order of their popularity. The content presented by the wagering game machine can comprise a random ordering of wagering game themes/wagering game titles within a menu stack. The content usage data can indicate the players' selections of wagering game titles from the menu stack. Content comprising different variations of menus, splash screens, offers, or other assets may be provided to players or to groups of players. The increase or decrease in popularity associated with the wagering games presented by the menu stack can be determined, based on the players' interactions with the content. As the popularity of the wagering games changes, the order in which the wagering games are presented within the menu stack can also be dynamically varied to reflect the popularity of the wagering games. It is noted that popular content can be evaluated with player patterns, wagering game usage information, and demographic information to ensure that the most popular and profitable games are always presented to a player with the most engaging user interface.

A system can also test different content, and present a combination of content based on testing results. For instance, one or several testing units can test a user interface, a marketing offer, and new wagering games separately, overlapping, or concurrently. The testing of different content can be deployed on a wagering game endpoint basis, user session basis, time slot basis, etc. After analysis of the testing results, the most successful user interface can be deployed to indicate the most successful new wagering game with the most successful marketing offer. The testing unit(s) can also test combinations of content to determine supplemental content that propels a primary content. For instance, a casino may wish to optimize success of a particular marketing offer. Dynamic user testing can be employed to determine that the particular marketing offer is most successful when offered with a particular wagering game and user interface, which may not be the most popular themselves. The testing unit(s) may determine that a new wagering game is more popular when presented without a marketing offer. The test results of various content combinations can be stored and later used for corresponding campaigns (e.g., content combination for a particular wagering game can be deployed when the wagering game developer wishes to initiate a campaign for the wagering game). As another example, different combinations of components of a menu or a user interface can be tested to determine a most effective interaction/combination of components (e.g., different components of a user interface).

Furthermore, the system can run tests for multiple challenger content. Each of multiple challenger content can be tested against a control content. The results of the tests can be stored and analyzed to determine a best performing one of the multiple challenger content. The best performing one of the multiple content can then be deployed to replace the control content, assuming criteria for replacing the control content are satisfied. Or the best performing one of the multiple content can be further tested. In the wagering game environment, the tests can be ongoing or frequently run to adapt any one of configurations, graphical user interface components, and wagering games to a dynamic player population.

Figure 5:
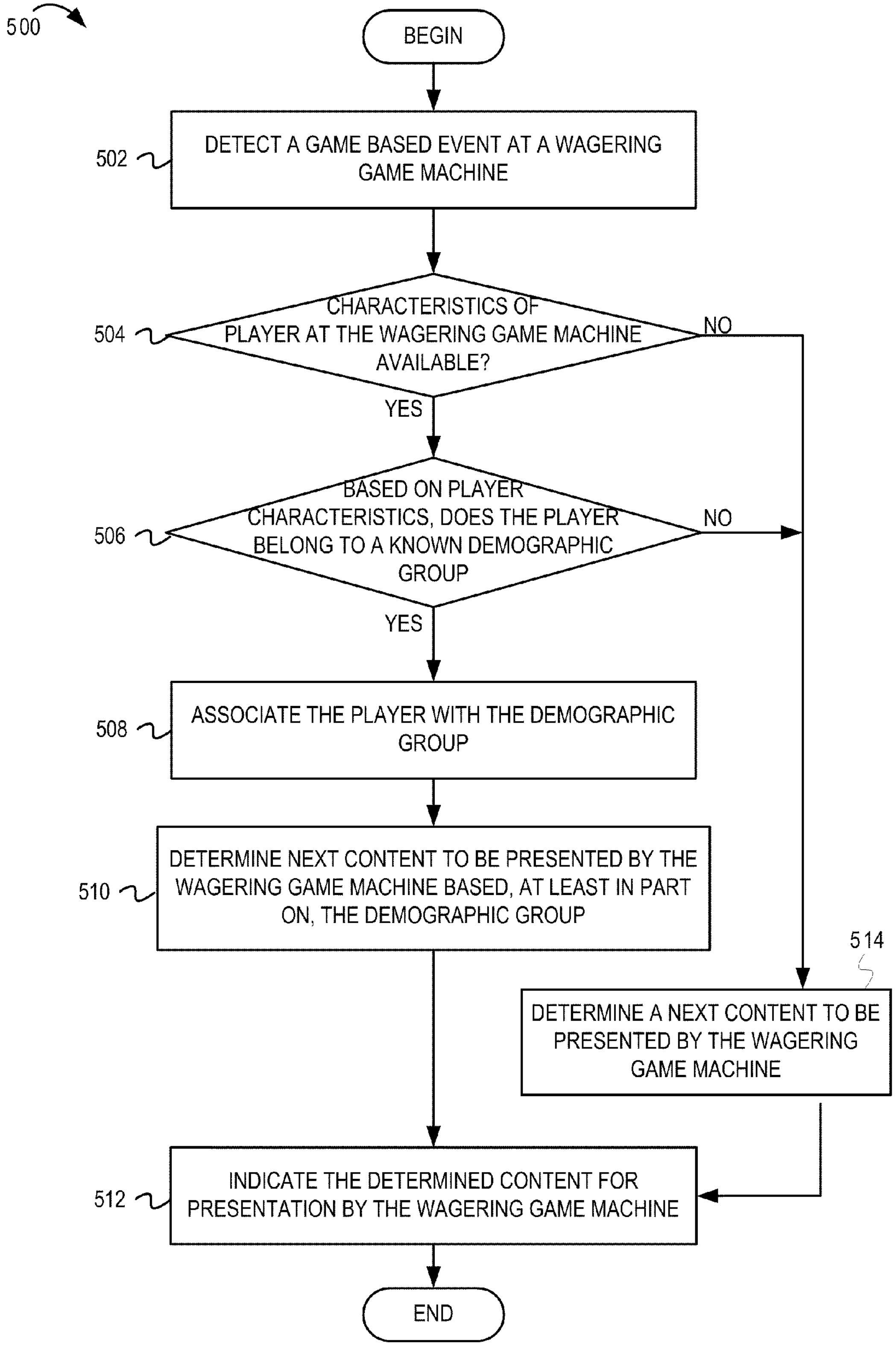
FIG. 5 is a flow diagram illustrating example operations for presenting content responsive to game-based events and in accordance with demographic groups.

FIG. 5 is a flow diagram illustrating example operations for presenting content responsive to game-based events and in accordance with demographic groups. Flow 500 begins at block 502.

At block 502, a game based event is detected at a wagering game machine. Examples of game based events can include a player winning or losing a threshold amount of money, a player selecting a GUI object on the wagering game machine display unit, and a player attempting to log out or cash out of the wagering game. The game based events can be detected in an attempt to entice the player to keep playing a current wagering game (e.g., by providing marketing offers, indicating potential leaderboard status, etc.), to play a new wagering game, etc. The flow continues at block 504.

At block 504, it is determined whether player characteristics associated with the player at the wagering game machine are available. For example, the player characteristics can be used to determine demographic groups to which the player belongs, to aggregate information from various data sources to generate a complete picture of the player's game play behavior, and/or to use the aggregated information to predict the player's future behavior. The player characteristics can also be used to determine the player's preferences, e.g., for wagering games, for receiving marketing offers, etc. The player characteristics may be determined from a player account server, a marketing server, a leaderboard server, a point of sale server, and other content servers. For example, the player account server may identify the player by a player identifier, an identifier of the player's wagering game machine, the player's game play behavior, and other general information about the player (e.g., age, place of residence, etc.). As another example, the marketing server may be queried to determine the player's marketing offer redemption history. As another example, the wagering game server can be queried to identify wagering games most commonly played by the player. If it is determined that the player characteristics associated with the player at the wagering game machine are available, the flow continues at block 506. Otherwise (e.g., if the player has not logged into the wagering game machine, if the player has configured his/her preferences, if the player is a new player, etc.), the flow continues at block 514.

At block 506, it is determined whether the player belongs to a known demographic group (i.e., data representing a demographic group is accessible by a testing unit). Embodiments can also dynamically determine a demographic group. Demographic groups can be determined based on evaluating player characteristics with content usage data across multiple platforms, for multiple players, etc. to predict how other players will react to similar content. Player characteristics can be collected from multiple data servers at multiple locations (e.g., at a wagering game machine bank level, at a casino level, at a regional or national level, etc.) and can be analyzed to determine trends that can be used to present content for future players. The demographic group may be defined by demographic group information or common characteristics associated with the players that constitute the demographic group. In some implementations, players with at least N similar characteristics may be categorized into demographic groups. Players can be categorized into demographic groups based on wagering games that players play, purchases made by and marketing offers redeemed by the players, the players' favorite customization options, age, gender, occupation, income level, and other such factors. For example, female players between the ages of 21 and 30 may form a first demographic group. As another example, players who have achieved leaderboard status may form a second demographic group. Depending on the requirement, the demographic group may be as constraining or as encompassing as desired. For example, if 50% of the players are men in their 30's, from southern states, who work in the chemical industry, a demographic group may be created to cater to players with these characteristics. Additionally, in some implementations, information from third party content servers can also be used to determine demographic group information. For example, based on knowledge that a convention of Midwestern farmers will be arriving at the casino, information about a Midwestern farmers demographic group can be collected (or purchased from the third party content server) to determine wagering games popular among the Midwestern farmers, marketing offers likely to be redeemed, game play history, etc. To determine the demographic group to which the player belongs, the player characteristics may be compared with the demographic group information. For example, if the player is a woman above the age of 40, it may be determined whether there are demographic groups that match the player's characteristics. If it is determined that the player belongs to a demographic group, the flow continues at block 508. Otherwise, the flow continues at block 514.

At block 508, the player is associated with the demographic group. The player can be associated with a demographic group based on the player characteristics such as age, gender, place of residence, occupation, education level, income-level, the player's game play behavior, etc. For example, a 25-year female player may be associated with a demographic group of women between the ages of 21 and 30. In some implementations, the player may be associated with more than one demographic group. For example, a 25-year female player who is a Midwestern farmer may be associated with the demographic group for women between the ages of 21 and 30 and also with the demographic group for Midwestern farmers. The flow continues at block 510.

At block 510, next content to be presented by the wagering game machine is determined based, at least in part, on the demographic group to which the player was associated. The next content to be presented on the wagering game machine can be determined based on knowledge of content that other players in the demographic group liked. For example, it may be determined from previous dynamic user testing that players in a demographic group of Las Vegas-based male players above the age of 60 like to play a fishing slots game and a video poker game, as well as eat at steakhouses. Accordingly, a suggestion for playing the fishing game and/or offers to visit the casino's steakhouse can be presented to a 62-year male player from Las Vegas who finished playing the video poker game. As another example, based on the player's characteristics, it may be determined that the player falls in the demographic group of Midwestern farmers. Demographic information associated with the Midwestern farmers' demographic group can be accessed to determine the wagering games most successful, from prior dynamic user tests, for players that belong to the Midwestern farmers' demographic group. Accordingly, a menu stack presented on the Midwestern farmer's wagering game machine display unit can be configured to present wagering games that are popular among the Midwestern farmers' demographic group at the forefront of the stack. The next content to be presented by other content servers can also be selected based on the demographic group to which the player belongs. For example, based on knowledge from prior tests results that other players in the player's demographic group prefer to shop for clothes rather than eat at a steakhouse, a marketing server can be prompted to present marketing offers for discounts at an apparel store. The demographic information can also be used to test variations of wagering game content, casino and third party marketing offers, leaderboard content, etc. before launching the content. The demographic information can be used to test new content against different demographic groups and to determine whether other players that belong to the demographic groups will respond positively or negatively to the content being tested (e.g., marketing offer, wagering game content, etc.). Based on testing results on the demographic group to which the player belongs, the next content can be selected to compare how one demographic group responds to the content vis-à-vis another demographic group. For example, the content may be tested to determine if male players respond differently as compared to female players. This can help in identifying content that maybe presented to the demographic groups and can also help in future game development. For example, based on analysis of the player characteristics and the content usage data, wagering game preferences can be determined for different demographic groups. Accordingly, wagering games can be designed and/or marketed to target specific demographic groups.

It is noted that the next content presented by the wagering game machine may be selected depending on the outcome of previously presented content. For example, it may be determined that there exist six wagering game content to be tested (i.e., six tests). The next content provided for presentation by the wagering game machine may be determined based on the results or player selections associated with the previously presented content. Thus, a fourth test may be presented to the player based on an outcome of a first test; a second test may be presented to the player based on the result of the fourth test; and so on. In other words, the tests need not be presented to the player in a preconfigured order. Rather, the order in which the tests are presented to the player may interdependent or may be dynamically varied based, at least in part, on results of one or more previous tests. In some implementations, the order according to which tests are presented may also be varied based on the demographic group to which the player belongs.

The flow 500 moves from block 504 to block 514 on determining that the player characteristics associated with the player at the wagering game machine cannot be identified. The flow 500 also moves from block 506 to block 514 on determining that, based on the player characteristics, the player cannot be associated with a demographic group. At block 514, the next content to be presented by the wagering game machine is determined. If a demographic group to which the player belongs cannot be identified or the player characteristics are not available, the next content to be presented on the wagering game machine can be determined at random. In some implementations, the next content may be determined based on the player's previous selections during a current wagering game session. For example, in response to determining that the player has completed playing a current wagering game, wagering games that are similar to (e.g., with similar design elements, with a similar wagering game strategy, liked by other people that played the wagering game currently being played by the player, etc.) the current wagering game may be identified. The identified similar wagering games may be suggested to the player. The next content can also be determined based on determining content that is currently most popular amongst players. For example, a list of wagering games ordered by popularity may be generated for presentation by the wagering game machine. The flow continues at block 512.

At block 512, the determined content is provided for presentation by the wagering game machine. The flow 500 moves from block 510 and from block 514 to block 512 after the next content to be provided to the wagering game machine is determined. The wagering game machine, in turn, presents the content on a display unit. From block 512, the flow ends.

It should be noted that although not depicted in FIG. 1, in some implementations, a data service unit might act as an intermediary between the reporting units 114, 118, 122, and 132 and the analysis unit 140. The data service unit may receive the content usage data from each of the reporting units, may consolidate the received content usage data, and may provide the consolidated content usage data to the analysis unit 140 for further analysis. For example, the data service unit may receive the content usage data and aggregate the content usage data associated with the challenger content and aggregate content usage data for the clone content. The service data unit may then supply aggregated content usage data.

The analysis unit 140 may also implement functionality to present content usage data reported by the reporting units, the challenger usage metric, the clone usage metric, the control usage metric, the results generated by the analysis unit 140, etc. on a dashboard for further analysis by a casino operator. The dashboard may also provide the casino operator with functionality for manually overriding various operations of the testing unit 101, the traffic splitting unit 102, and/or the analysis unit 140 to enforce certain rules. For example, the casino operator may manually override the decision of the analysis unit 140 to replace the control content 106 by the challenger content 107, if the casino operator determines that the challenger content 107 does not significantly outperform the control content 106. The functionality for manual overriding can enable the casino operator to instantaneously implement decisions based on prior knowledge, expertise, etc. For example, the casino operator may override instructions to display one variation of wagering game content at noon, based on knowledge that another variation of the wagering game content is more popular at noon. The functionality for manual overriding can also give the casino operator control over content presented by the wagering game machines and other end points (e.g., online game environments, leaderboards, viewports, etc.), and can allow for graceful fail-over and disaster recovery in case of failures or crashing of the platform. The functionality for manual overriding can also enable the casino operator to perform quality control against content before the content is presented to the players.

Although examples refer to testing wagering game content, embodiments are not so limited. In some implementations, tests can be generated to test the player's state of mind while playing the wagering game. The test may be provided to all players within a demographic group or may be randomly provided to players irrespective of their demographic group. In one example, based on knowledge that a demographic group is very competitive and is likely to wager large bets, a test may be generated to determine the maximum amount of money the player is likely to pay in order to unlock a bonus round. In other words, tests can be generated to determine how much players are willing to pay for something they really want based on how much the players have won or lost. As another example, tests may be provided to players depending on the player's emotional state. For example, based on knowledge that the player has lost N consecutive wagering games and that the player has attempted and failed to unlock the bonus round, the bonus round could be presented to the player to test whether receiving the bonus round improves the player's emotional state, results in the player continuing to play wagering games, results in the player wagering more money, etc. Information about the player's emotional state, the player's selections on the wagering game machines, etc. can be stored and can be used to determine content to be presented to other players within the same demographic group and with a similar emotional state.

Lastly, it is noted that dynamic testing techniques in a casino environment as described with reference to FIGS. 1-5 need not be implemented only in response to a player activating a wagering game machine or in response to a game-based event. The dynamic testing techniques can be implemented in the casino environment to determine information about the wagering game machines. For example, it may be determined that players tend to gravitate towards one set of wagering game machines on one side of the casino floor as compared to another set of wagering game machines on the opposite side of the casino floor. Content usage data can be collected and analyzed to determine why the players prefer one set of wagering game machines and to determine how players can be enticed to play at the other set of wagering game machines. Tests can also be executed to determine a best mode for displaying lighting effects. For example, tests may be executed to estimate the players' level of excitement (e.g., tied to the players' wagering pattern, etc.) for various lighting effects. For example, it may be determined whether presenting flashing lights along the sides of the wagering game machines versus presenting flashing lights on top of the wagering game machines influences the players' wagering behavior.

Operating Environment

This section describes an example operating environment and presents structural aspects of some embodiments. This section includes discussion about wagering game networks and wagering game machine architectures.

Wagering Game Networks

Figure 6:
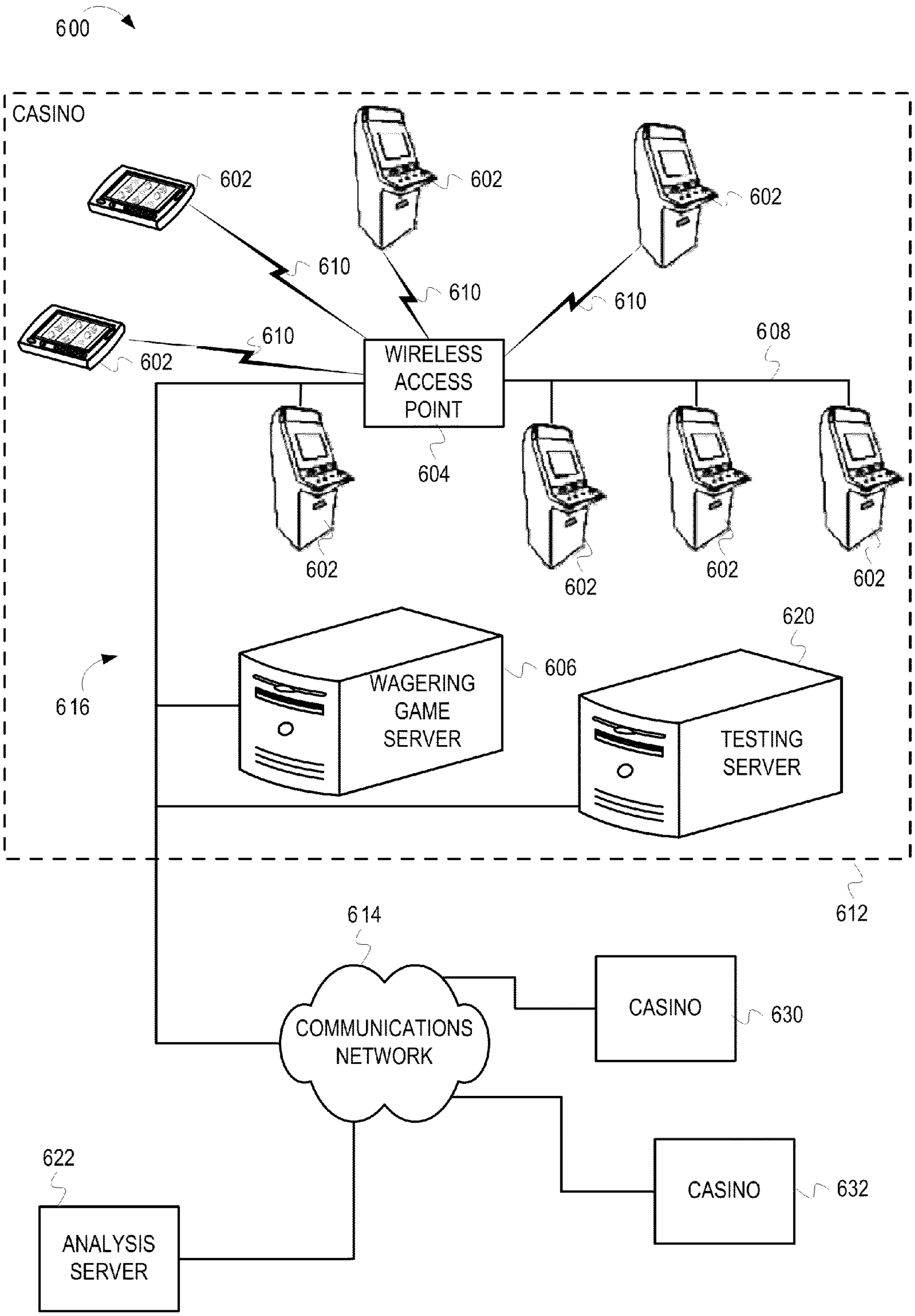
FIG. 6 is a block diagram illustrating a wagering game network, according to example embodiments of the invention.

FIG. 6 is a block diagram illustrating a wagering game network 600, according to example embodiments of the invention. As shown in FIG. 6, the wagering game network 600 includes a plurality of casinos 612, 630, and 632 connected to a communications network 614. The plurality of casinos 612, 630, and 632 is also connected to an analysis server 622.

Each casino 612 includes a local area network 616, which includes an access point 604, a wagering game server 606, a testing server 620, and wagering game machines 602. The access point 604 provides wireless communication links 610 and wired communication links 608. The wired and wireless communication links can employ any suitable connection technology, such as Bluetooth, 802.11, Ethernet, public switched telephone networks, SONET, etc. In some embodiments, the wagering game server 606 can serve wagering games and distribute content to devices located in other casinos 612 or at other locations on the communications network 614. The testing server 620 performs dynamic user testing with the wagering game machines 602. Each test comprises presenting control content, challenger content, and clone content. The testing server 620 can comprise a traffic splitting unit (not shown) that identifies an activated ones of the wagering game machines 602, determines the content to be provided to the activated ones of the wagering game machines 602, and indicates the appropriate content to the activated ones of the wagering game machines 602, perhaps via the wagering game server 606.

The analysis unit 622 analyzes content usage data received from each of the wagering game machines 602 resulting from the dynamic user testing. The analysis unit 622 determines whether the challenger content outperforms the control content. If so, the analysis server 622 can direct the testing server 620 and/or the wagering game server 606 to replace the control content with the challenger content. Alternately, if the analysis unit 622 determines that the challenger content does not outperform the control content, the analysis server 622 can direct the testing server 620 to discard the challenger content as was described with reference to FIG. 4. The analysis server 622 can evaluate the content usage data with the player characteristics to determine demographic information, etc. within a single casino 612 or across multiple casinos 612, 630, and 632 as was described with reference to FIG. 5. The analysis unit 622 can implement functionality to determine trends based on demographic groups, the player's emotional state, the player's characteristics, etc. as was described with reference to FIG. 5. The analysis unit 622 can also evaluate the content usage data to determine popular content and to direct the wagering game server and other content servers to present, in real time, the popular content to appropriate wagering game endpoints. The analysis unit 622 can also direct that content (and tests) be presented to another player based on demographic groups to which the player belongs, the player's emotional state, the player's game play behavior, etc.

Additionally, the testing server 620 and/or the analysis server 622 can be configured to connect to and interact with legacy gaming components, leaderboards, casino advertising networks, marketing servers, point of sale devices, viewports, other content servers, etc. For example, the analysis server 622 can connect to a player account server to determine the player characteristics. As another example, the analysis unit 622 can interact with a leaderboard management server to provide content for display on a leaderboard.

The wagering game machines 602 described herein can take any suitable form, such as floor standing models, handheld mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In some embodiments, the wagering game machines 602 and the wagering game servers 606 work together such that a wagering game machine 602 can be operated as a thin, thick, or intermediate client. For example, one or more elements of game play may be controlled by the wagering game machine 602 (client) or the wagering game server 606 (server). Game play elements can include executable game code, lookup tables, configuration files, game outcome, audio or visual representations of the game, game assets, or the like. In a thin-client example, the wagering game server 606 can perform functions such as determining game outcome or managing assets, while the wagering game machine 602 can present a graphical representation of such outcome or asset modification to the user (e.g., player). In a thick-client example, the wagering game machines 602 can determine game outcomes and communicate the outcomes to the wagering game server 606 for recording or managing a player's account.

In some embodiments, either the wagering game machines 602 (client) or the wagering game server 606 can provide functionality that is not directly related to game play. For example, account transactions and account rules may be managed centrally (e.g., by the wagering game server 606) or locally (e.g., by the wagering game machine 602). Other functionality not directly related to game play may include power management, presentation of advertising, software or firmware updates, system quality or security checks, etc.

Any of the wagering game network components (e.g., the wagering game machines 602) can include hardware and machine-readable media including instructions for performing the operations described herein.

Wagering Game Machine Architectures

Figure 7:
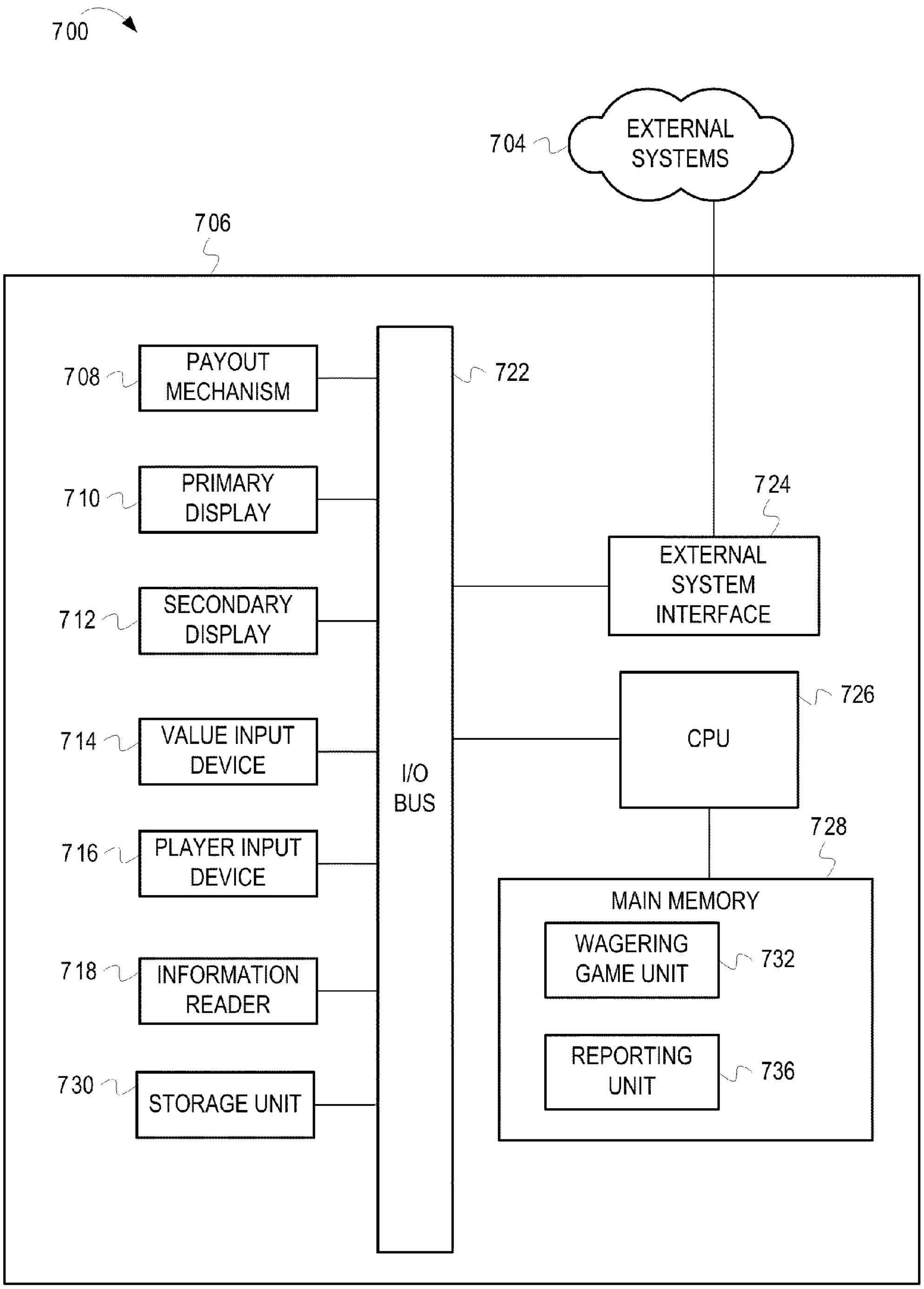
FIG. 7 is a block diagram illustrating wagering game machine architecture, according to example embodiments of the invention.

FIG. 7 is a block diagram illustrating wagering game machine architecture, according to example embodiments of the invention. As shown in FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732 and a reporting unit 736. In one embodiment, the wagering game unit 732 can present wagering games, such as video poker, video blackjack, video slots, video lottery, etc., in whole or part. Embodiments are not limited to implementing the reporting unit 736 in machine-readable media (e.g., the main memory 728). Embodiments can implement the reporting unit 736 as an application specific integrated circuit or a field programmable gate array. Embodiments may also implement some testing functionality in the wagering game machine architecture 706. For instance, a process or component can account for sessions that present control, challenger, and clone content at the wagering game machine.

The reporting unit 736 implements functionality for recording content usage data and providing the content usage data to an analysis unit for further analysis. The content usage data comprises indications of a player's interaction with the wagering game machine 700. For example, the reporting unit 736 may indicate that the player configured a button presented on a top right corner of a primary display 710 to present lighting effects. The content usage data can also record and report the player's choices and flow of choices. For example, the reporting unit 736 may indicate that after selecting button A, the player selected option B. Although FIG. 7 depicts the reporting unit 736 embodied as part of the wagering game machine 700, in other embodiments, the reporting unit 736 may be distinct from the wagering game machine 700. Moreover, multiple wagering game machines 700 may communicate their respective content usage data to a single reporting unit. The wagering game unit 732 receives, e.g., from the testing server 620 and/or from the wagering game server 606 of FIG. 6, indications of content to be presented on the wagering game machine 700 and directs the primary display 710 to present the content. The CPU 726 is connected to an input/output (I/O) bus 722, which can include any suitable bus technologies, such as an AGTL+frontside bus and a PCI backside bus. The I/O bus 722 is connected to a payout mechanism 708, the primary display 710, a secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks).

In one embodiment, the wagering game machine 706 can include additional peripheral devices and/or more than one of each component shown in FIG. 7. For example, in one embodiment, the wagering game machine 706 can include multiple external system interfaces 724 and/or multiple CPUs 726. In one embodiment, any of the components can be integrated or subdivided.

Any component of the architecture 700 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). Machine-readable media can be machine-readable storage media or machine-readable signal media. Examples of machine-readable storage media include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Examples of machine-readable signal media can be in the form of an electro-magnetic signal, an optical signal, or any suitable combination thereof.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of dynamic testing with a wagering game environment testing unit comprising:

the wagering game environment testing unit accessing a rules engine to determine one or more testing criteria;

selecting challenger content based, at least in part, on the testing criteria;

the wagering game environment testing unit determining a first percentage of player wagering game sessions for presenting challenger content;

the wagering game environment testing unit determining a second percentage of player wagering game sessions for presenting control content, wherein said determining the first and second percentages are based, at least in part, on the testing criteria;

testing the challenger content in a live wagering game environment in accordance with the first percentage and the second percentage of player wagering game sessions;

analyzing usage data generated from said testing the challenger content in the live wagering game environment;

determining that the challenger content outperforms the control content based, at least in part, on said analyzing the usage data; and replacing at least a majority of the control content with the challenger content in the live wagering game environment responsive to said determining that the challenger content outperforms the control content.

2. The method of claim 1, wherein the first percentage and the second percentage are based on one of active wagering game machines and sessions initiated with player logins.

3. The method of claim 1, wherein the testing criteria comprise at least one of demographic criteria, marketing criteria, temporal criteria.

4. The method of claim 1 further comprising backtesting the challenger content to confirm that the challenger content outperforms the control content.

5. The method of claim 1 further comprising collecting first usage data that indicates user interactions with the challenger content and second data that indicates user interactions with the control content, wherein said usage data comprises the first usage data and the second usage data.

6. The method of claim 1 further comprising modifying content on at least one other platform that differs from the platform of the player wagering game session based, at least in part, on said analyzing the usage data generated from said testing the challenger content in the live wagering game environment.

7. The method of claim 6, wherein the other platform comprises one of an online gaming platform, a marketing platform, a leaderboard platform, and a point of sale platform.

8. The method of claim 1, wherein the challenger content and the control content comprise one of a wagering game, a menu option, a graphical user interface component, and a marketing offer.

9. The method of claim 1, wherein the control content comprises one of previously tested content and content with a delineated success factor.

10. The method of claim 1, wherein said testing the challenger content in the live wagering game environment in accordance with the first percentage and the second percentage of player wagering game sessions comprises:

presenting the challenger content on the second percentage of player wagering game sessions in the live wagering game environment;

presenting the control content on the first percentage of player wagering game sessions in the live wagering game environment; and collecting the usage data for the challenger content and the control content from the player wagering game sessions.

11. The method of claim 10 further comprising:

presenting clone content on the second percentage of player wagering game sessions in the live wagering game environment, wherein the clone content is the same as the control content;

collecting the usage data for the clone content from the wagering game sessions presenting the clone content;

wherein said testing the challenger content continues until the usage data for the clone content is substantially similar to the usage data of the control content.

12. One or more non-transitory machine-readable storage media having instructions stored thereon, which, when executed by a processor, cause the processor to:

determine a distribution of challenger content and control content for testing the challenger content against the control contenting across a plurality of wagering game machines;

communicate the distribution to a subset of the plurality of wagering game machines that will present the challenger content, wherein the processor to communicate the distribution to at least those of the plurality of wagering game machines that will present the challenger content comprises the instructions to cause the processor to indicate the challenger content to those of the plurality of wagering game machines that will present the challenger content;

wherein the instructions also cause the processor to indicate clone content to a second subset of the plurality of wagering game machines, wherein the second subset of the plurality of wagering game machines is equal to the subset of the plurality of wagering game machine that will present the challenger content, wherein the clone content is the same as the control content;

initiate testing of the challenger content against the control content on the plurality of wagering game machines;

determine, from the testing, first metrics of user interactions with the challenger content and second metrics of user interactions with the control content on the plurality of wagering game machines; and update content presentation at the plurality of wagering game machines based, at least in part, on the first metrics and the second metrics.

13. The non-transitory machine-readable storage media of claim 12, wherein the instructions to cause the processor to update content presentation at the plurality of wagering game machines based, at least in part, on the first metrics and the second metrics comprises the processor to command those of the plurality of wagering game machines presenting control content to present the challenger content instead of the control content, to command those of the plurality of wagering game machines presenting challenger content to present new challenger content, or to command the plurality of wagering game machines to present new challenger content and new control content in accordance with the distribution.

14. An apparatus comprising:

a network interface that communicatively couples the apparatus to a plurality of wagering game machines; and a testing unit operable to, determine a distribution of challenger content and control content for testing the challenger content against the control contenting across the plurality of wagering game machines, wherein the challenger content comprises a first component and a second component and the control content comprises a corresponding third and fourth component;

communicate, via the network interface, the distribution to a subset of the plurality of wagering game machines that will present the challenger content;

initiate testing of the challenger content against the control content on the plurality of wagering game machines;

determine, from the testing, first metrics of user interactions with the challenger content and second metrics of user interactions with the control content on the plurality of wagering game machines; and update content presentation at the plurality of wagering game machines based, at least in part, on the first metrics and the second metrics, wherein the testing unit being operable to update the content presentation at the plurality of wagering game machines comprises the testing unit being operable to, test a second challenger content against the control content on the plurality of wagering game machines, wherein the second challenger content comprises the first component and a fifth component;

determine third metrics of user interaction with the second challenger content and fourth metrics of user interaction with the control content on the plurality of wagering game machines; and select either the second or fifth component for a third challenger content based, at least in part, on the first, second, third, and fourth metrics.

15. The apparatus of claim 14, wherein the testing unit is further operable to collect the first metrics and the second metrics from the plurality of wagering game machines.

16. The apparatus of claim 15, wherein the testing unit is further operable to compare the first metrics and the second metrics, wherein the update is based on the comparison.

17. The apparatus of claim 14, wherein the testing unit being operable to update the content presentation at the plurality of wagering game machines comprises the testing unit being operable to, test a second challenger content against the control content on the plurality of wagering game machines;

determine third metrics of user interaction with the second challenger content and fourth metrics of user interaction with the control content on the plurality of wagering game machines; and select either the challenger content or the second challenger content based, at least in part, on the first, second, third, and fourth metrics.

18. A system comprising:

a testing unit operable to, determine a distribution of challenger content and control content for testing the challenger content against the control content across a plurality of wagering game machines;

deploy the challenger content and the control content across the plurality of wagering game machines in accordance with the distribution;

a set of one or more reporting units associated with the plurality of wagering game machines operable to, collect, from the plurality of wagering game machines, usage data that indicates player interactions with the control content and the challenger content;

an analysis unit operable to analyze the usage data and generate a first metric for the control content and a second metric for the challenger content based on analysis of the usage data, and report the first metric and the second metric to the testing unit, and a rules engine that hosts a plurality of rules that govern at least one of the distribution and selection of the challenger content to test, wherein the testing unit is operable to query the rules engine for at least one of selecting of the challenger content and determining the distribution.

19. The system of claim 18 further comprising the testing unit operable to replace the control content with the challenger content on those of the plurality of wagering game machines presenting the control content, replace the challenger content with new challenger content on those of the plurality of wagering game machine presenting the challenger content, or add a second challenger content and a second control content respectively to those of the plurality of wagering game machines presenting the challenger content and those of the plurality of wagering game machines presenting the control content, based, at least in part, on the first metric and the second metric.

20. The system of claim 18, wherein the challenger content comprises a first component and a second component and the control content comprises a corresponding third and fourth component, wherein the testing unit being operable to, test a second challenger content against the control content on the plurality of wagering game machines, wherein the second challenger content comprises the first component and a fifth component;

determine third metrics of user interaction with the second challenger content and fourth metrics of user interaction with the control content on the plurality of wagering game machines; and select either the second or fifth component for a third challenger content based, at least in part, on the first, second, third, and fourth metrics.

21. The system of claim 18, wherein the testing unit being is operable to, test a second challenger content against the control content on the plurality of wagering game machines;

determine third metrics of user interaction with the second challenger content and fourth metrics of user interaction with the control content on the plurality of wagering game machines; and select either the challenger content or the second challenger content based, at least in part, on the first, second, third, and fourth metrics.

* * * * *